United States Patent [19]
Lysson et al.

[11] Patent Number: 5,843,199
[45] Date of Patent: Dec. 1, 1998

[54] METHOD AND DEVICE FOR FIRE-POLISHING A LENGTHWISE EXTENDED GLASS BODY

[75] Inventors: Hans-Jürgen Lysson, Korschenbroich; Frank Lisse, Köln; Robert Fenner, Mönchengladbach, all of Germany

[73] Assignee: Alcatel Kabel AG & Co., Germany

[21] Appl. No.: 631,454

[22] Filed: Apr. 12, 1996

[30] Foreign Application Priority Data

Apr. 12, 1995 [DE] Germany .................. 195 13 862.7

[51] Int. Cl.⁶ ............... C03B 23/045; C03B 37/012
[52] U.S. Cl. ............ 65/29.18; 65/29.19; 65/65; 65/104; 65/120; 65/158; 65/162; 65/271; 65/279; 65/284; 65/292; 65/377; 65/378; 65/384; 65/385; 65/484; 65/485; 65/488
[58] Field of Search ............. 65/29.19, 29.18, 65/29.12, 65, 104, 108, 109, 120, 158, 162, 163, 268, 269, 271, 279, 284, 292, DIG. 13, 377, 378, 384, 385, 404, 484, 485, 488

[56] References Cited

U.S. PATENT DOCUMENTS

| | | | |
|---|---|---|---|
| 172,624 | 1/1876 | Hall | 82/150 |
| 2,370,918 | 3/1945 | Rohl | 142/53 |
| 2,731,772 | 1/1956 | Ehret, Jr. et al. | |
| 3,263,852 | 8/1966 | Fridrich | 65/109 |
| 3,485,613 | 12/1969 | Herczog et al. | 65/120 |
| 3,537,833 | 11/1970 | Gossie et al. | 65/109 |
| 3,576,611 | 4/1971 | Obersby | 65/29.19 |
| 4,578,101 | 3/1986 | Clark et al. | 65/109 |
| 4,619,681 | 10/1986 | Tetaz et al. | 65/29.18 |
| 4,702,132 | 10/1987 | Grosse | 82/165 |
| 4,731,103 | 3/1988 | Mizutani et al. | 65/378 |
| 5,158,589 | 10/1992 | Curtis et al. | 65/109 |
| 5,192,350 | 3/1993 | Le Sergent | 65/109 |
| 5,211,730 | 5/1993 | Kanamori et al. | 65/120 |

FOREIGN PATENT DOCUMENTS

| | | |
|---|---|---|
| 0216338 | 4/1987 | European Pat. Off. . |
| 0519479 | 12/1992 | European Pat. Off. . |
| 0525681 | 2/1993 | European Pat. Off. . |
| 0612700 | 8/1994 | European Pat. Off. ............ 65/65 |
| 2732615 | 2/1979 | Germany . |
| 3321711 | 12/1984 | Germany . |
| 4314638 | 11/1994 | Germany . |
| 60-186431 | 9/1985 | Japan ........................ 65/377 |
| 60-260439 | 12/1985 | Japan ........................ 65/428 |
| 2-275723 | 11/1990 | Japan ........................ 658/275 |
| 3-131541 | 6/1991 | Japan ........................ 65/292 |
| 544618 | 1/1977 | U.S.S.R. ..................... 65/158 |
| 996345 | 2/1983 | U.S.S.R. ..................... 65/162 |
| 564140 | 9/1944 | United Kingdom . |
| 2176472 | 12/1986 | United Kingdom . |

OTHER PUBLICATIONS

Strainoptic™ Universal Polarimeter System PS–100 Bulletin PS–101.

*Primary Examiner*—Steven P. Griffin
*Attorney, Agent, or Firm*—Ware, Fressola, Van Der Sluys & Adolphson LLP

[57] ABSTRACT

During the fire-polishing of a lengthwise extended glass body (3), for example a preform for drawing optical fibers, the glass body (3) is held by a holding device (5, 7), and is heated by a burner (23) moving at a variable advancing speed parallel to the lengthwise axis (19). The surface temperature of the glass body (3) is determined with a temperature measuring device (25). The mechanical stress condition of the glass body (3) is detected with an optical device (29) and can be controlled by varying the burner temperature and/or the advancing speed of the burner. The invention makes it possible to counteract the occurrence of high mechanical stresses in the glass body (3).

10 Claims, 1 Drawing Sheet

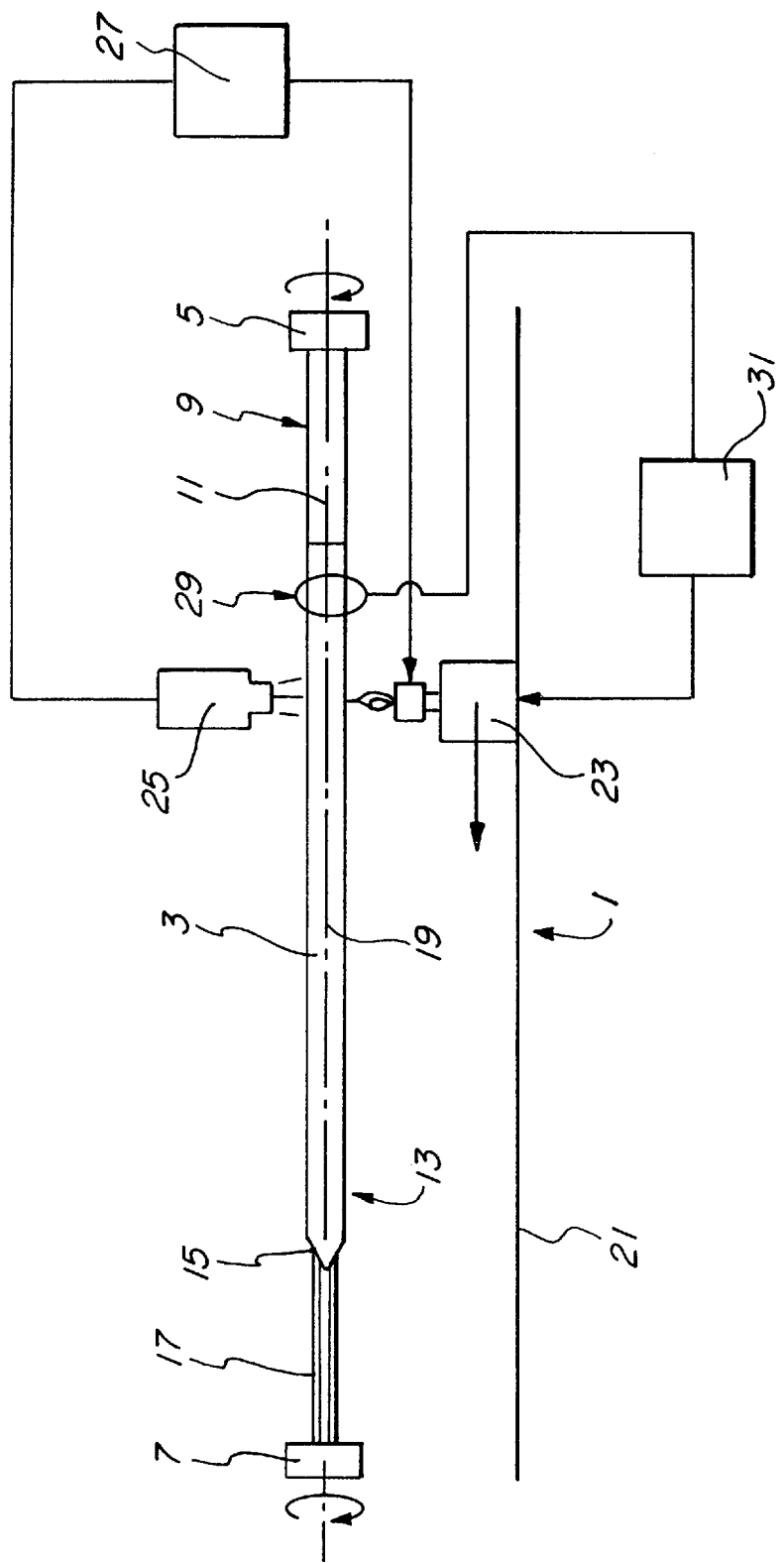

METHOD AND DEVICE FOR FIRE-POLISHING A LENGTHWISE EXTENDED GLASS BODY

BACKGROUND OF THE INVENTION

1. Technical Field

The invention relates to a method and device for fire-polishing a lengthwise extended glass body, where the glass body is held by a holding device and is heated by a burner that can travel in parallel to the lengthwise axis.

2. Description of the Prior Art

DE 43 14 638 A1 describes a method and a device for fire-polishing a lengthwise extended glass body. A lengthwise extended glass body is clamped in two rotary chucks. To improve its surface quality, the glass body is fire-polished with a burner which can travel in the lengthwise direction of the glass body. A glass body surface that is very homogeneous and free of contamination is particularly important for drawing high-grade, mechanically strong optical glass fibers, which exhibit reproducible optical properties for the transmission of data. For that reason, the lengthwise extended glass body, a so-called preform, is fire-polished immediately before the fiber is drawn. At that point, material is intentionally ablated from the surface of the glass body. The temperature on the surface of the glass body is measured to control this process. For adjusting a predetermined temperature on the surface of the glass body, the actual value of the measured surface temperature is supplied to a regulator, which influences the amount of gas available to the burner. At that point the burner travels at a constant rate.

This method does not take into consideration possible mechanical stresses of the glass body, which could arise during the fire-polishing and could imply a danger of breakage of the glass body. As a rule, such mechanical stresses are caused by insufficient heating or too rapid cooling of the glass body. However, measuring the surface temperature of the glass body during the fire-polishing does not provide any information about the heating or the cooling process inside the glass body. In addition, the occurrence of unwanted mechanical stresses in the glass body is further influenced by the typical variance of the diameter of the glass body. For example, preforms used for the fiber drawing can vary ±5% from the rated value.

SUMMARY OF THE INVENTION

Starting from this state of the art, the invention solves the problem of preventing the occurrence of undesirable mechanical stresses in a lengthwise extended glass body during fire-polishing. This problem is solved by detecting the mechanical stress condition of the glass body and varying the advancing speed of the burner.

The advantages that can be achieved with the invention are particularly that, by detecting the mechanical stress condition of the glass body and by adjusting the advancing speed of the burner as a function of this mechanical stress condition and/or of the surface temperature of the glass body, the mechanical stresses that occur in the glass body during fire-polishing can be significantly reduced, thereby avoiding the danger of breakage of the lengthwise extended glass body. In addition, the stress condition detected in the glass body can also be used to adjust the temperature of the burner. The invention is especially suited for fire-polishing glass preforms used to manufacture high-grade glass fibers, where the fire-polishing of the invention increases the fiber strength, reduces the danger of fiber breakage and improves the optical properties of the glass fibers.

To reduce the mechanical stresses occurring in the glass body in a particularly effective manner, it is an advantage if the advancing speed of the burner is varied as a function of the stress condition of the glass body. To detect the mechanical stresses occurring in the glass body in a most precise manner that can be used for the purposes of the invention, it is advantageous if the mechanical stress condition of the glass body is determined with an optical device that travels together with the burner.

It is particularly advantageous if the optical device comprises a pair of polarizing filters and a detector. This allows the mechanical stress condition of the glass body to be determined in a particularly simple manner, since stress birefringence can be used to analyze the occurring color effects as a measure of the mechanical stress condition of the glass body.

The invention will be fully understood when reference is made to the following detailed description taken in conjunction with the accompanying drawing.

BRIEF DESCRIPTION OF THE DRAWING

The FIGURE is a schematic illustration of the device of the present invention performing the method of the present invention.

DETAILED DESCRIPTION OF THE INVENTION

A device 1 for fire-polishing a lengthwise extended glass body 3, such as a preform used to draw optical glass fibers used in the transmission of data, is illustrated in the drawing FIGURE. The device 1 has a first driven chuck 5 at one end, which can rotate around a lengthwise axis 19, and a second chuck 7 at the other opposite end, which can rotate around the lengthwise axis 19.

A lengthwise extended glass body 3 has a cylindrical shape and has a gripping section 11 at its first end 9 in the form of a welded quartz rod. The gripping section 11 at the first end 9 of the glass body 3 is clamped into the first chuck 5. At its second end 13, the glass body 3 has an approximately conical point 15 which faces away from the first end 9. The lengthwise extended glass body 3 is introduced into a thick-walled quartz tube 17 at the second end 13 in such a way, that the glass body 3 extends partially into the quartz tube 17 at the end 13. The quartz tube 17 is made of the same material as the outside material of the lengthwise extended glass body 3, which is built up in layers so it can be used as a preform for drawing optical fibers. The quartz tube 17 is clamped in the second chuck 7 at the end that faces away from the point 15 of the glass body 3. In this way, the lengthwise extended glass body 3, which is rotated around its lengthwise axis 19 by the first driven chuck 5, is held fast and secure as well as concentric with the lengthwise axis 19.

A burner 23 is located on a bench 21 of device 1, and is used to heat the lengthwise extended glass body 3 for the fire-polishing. The burner 23, which operates with gas, can travel on the bench 21 at least parallel to the lengthwise axis 19 of the lengthwise extended glass body 3, but can also travel crosswise. To fire-polish the glass body 3, the burner 23 travels in the direction of the arrow along the glass body 3, which rotates around its lengthwise axis 19, starting from the gripping section 11 to the point 15 of the glass body 3, while maintaining an equal radial distance between the lengthwise extended glass body 3 and the burner 23. Because of the ablation of material during fire-polishing, a lengthwise extended glass body 3 is obtained with a smooth surface that is free of contamination, which is well suited for drawing high-strength glass fibers with good optical properties.

To determine the surface temperature of the glass body 3, a temperature measuring device 25 that is suitable for measuring high temperatures is provided. The device 25 can be moved in the direction of the lengthwise extended glass body 3 and determines the surface temperature of the glass body 3 in the lengthwise direction, at the respective position of the burner 23. This temperature on the surface of the glass body 3 in the area of burner 23 is the actual value supplied to a first control device 27. The determined actual value is compared by the first control device 27 with a predetermined rated value, which is between 1400° and 1800°C. In the present configuration example, the temperature of the burner is adjusted as a function of the temperature determined from the surface of the glass body 3, in order to attain the predetermined rated value of the temperature. This can be achieved with the amount of gas made available to the burner 23.

An optical device 29, comprising a pair of polarizing filters and a detector, is provided to detect the mechanical stress condition of the lengthwise extended glass body 3. The detection of the mechanical stress condition in glass using the color effects detected when light penetrates the glass is well known in the art. During fire-polishing, the optical device 29 travels at a predetermined distance (e.g., about 10 to 30 cm, for example, 20 cm) behind the burner 23. This distance is chosen to enable a good evaluation of the mechanical stresses in the glass body 3 after it has cooled to a temperature below 1050° C. The color effects in the glass body 3 are analyzed as a measure of the stresses occurring therein.

The analysis of the color effects can be achieved with a corresponding photodiode. The signal produced in this manner with the optical device 29 is supplied as a measured value to a second control device 31, where it is processed. On the basis of this signal, the advancing speed of the burner 23 is varied as a function of the mechanical stress condition of the glass body 3, by either reducing or increasing the advancing speed of the burner 23 with respect to a predetermined rated value if stresses are detected in the glass body 3. Because of the lag time existing between the change in the burner 23 advance and the recognition of the effects on the stresses in the glass body 3 by the optical device 29, the time constant of the second control device 31 must be chosen to be very large. The function of the second control device 31, namely the increase or decrease in the advancing speed of the burner 23 as a function of the mechanical stress condition detected in the glass body 3, relies on empirically determined values.

It is also possible to control the advancing speed of the burner 23 as a function of the surface temperature of the glass body 3 alone, or as a function of the mechanical stress condition of the glass body 3 plus its surface temperature. Accordingly, the temperature of the burner 23 can also be regulated as a function of the mechanical stress condition of the glass body 3 alone, or as a function of the mechanical stress condition plus the surface temperature of the glass body 3.

If both the stress condition of the glass body and its surface temperature are used as input variables to control the advancing speed of the burner and to regulate the temperature of the burner, it is useful to provide a common control device for both variables.

The preferred embodiment described above admirably achieves the objects of the invention. However, it will be appreciated that departures can be made by those skilled in the art without departing from the spirit and scope of the invention which is limited only by the following claims.

What is claimed is:

1. A method for fire-polishing a lengthwise extended glass body, the method comprising the steps of:
    (a) holding a glass body with a holding device;
    (b) heating the glass body by a burner having a burner temperature, the burner travels parallel to a lengthwise axis of the glass body at an advancing speed;
    (c) determining a surface temperature of the glass body with a temperature measuring device;
    (d) detecting a mechanical stress condition of the glass body; and
    (e) varying at least one of the advancing speed of the burner and the burner temperature as a function of at least one of the mechanical stress condition of the glass body and the surface temperature of the glass body.

2. A method as claimed in claim 1, wherein the advancing speed of the burner is varied as a function of the mechanical stress condition of the glass body.

3. A method as claimed in claim 1, wherein the mechanical stress condition of the glass body is detected with an optical device that travels with the burner.

4. A method as claimed in claim 3, wherein the optical device comprises a pair of polarizing filters and a detector.

5. A method as claimed in claim 3, wherein the optical device is located at a predetermined distance from the burner.

6. A method as claimed in claim 1, wherein a measure of the mechanical stress condition of the glass body is obtained by analyzing color effects occurring therein.

7. A method as claimed in claim 1, wherein the surface temperature of the glass body is determined at a position of the burner.

8. A device for fire-polishing a lengthwise extended glass body, the device comprising:
    (a) a holding device for the lengthwise extended glass body;
    (b) a burner which can travel along the glass body at an advancing speed;
    (c) a temperature measuring device to determine a surface temperature of the glass body;
    (d) a device to detect a mechanical stress condition of the glass body; and
    (d) means for varying at least one of the advancing speed of the burner and the burner temperature as a function of at least one of the mechanical stress condition of the glass body and the surface temperature of the glass body.

9. A device as claimed in claim 8, wherein the device to detect a mechanical stress condition is an optical device with a pair of polarizing filters and a detector.

10. A device as claimed in claim 8, wherein the device to detect a mechanical stress condition is an optical device which travels with the burner with a predetermined distance established between the burner and the optical device.

* * * * *